US008922346B2

(12) United States Patent
White

(10) Patent No.: US 8,922,346 B2
(45) Date of Patent: Dec. 30, 2014

(54) MASKED CONTAINER RFID TAG COMMUNICATIONS SYSTEM

(75) Inventor: Christopher J. White, Avon, NY (US)

(73) Assignee: Eastman Kodak Company, Rochester, NY (US)

( * ) Notice: Subject to any disclaimer, the term of this patent is extended or adjusted under 35 U.S.C. 154(b) by 353 days.

(21) Appl. No.: 13/549,611

(22) Filed: Jul. 16, 2012

(65) Prior Publication Data
US 2014/0015641 A1 Jan. 16, 2014

(51) Int. Cl.
G08B 13/14 (2006.01)
(52) U.S. Cl.
USPC ............ 340/10.1; 340/572.1; 340/572.7
(58) Field of Classification Search
USPC ............ 340/10.1, 572.1, 572.7, 425.1, 425.2, 340/12.19, 10.3; 343/703, 731, 742, 743, 343/788, 893
See application file for complete search history.

(56) References Cited

U.S. PATENT DOCUMENTS

| 5,565,858 | A | * | 10/1996 | Guthrie | 340/10.33 |
| 6,725,014 | B1 | | 4/2004 | Voegele | |
| 6,731,904 | B1 | * | 5/2004 | Judd | 455/11.1 |
| 7,075,437 | B2 | | 7/2006 | Bridgelall et al. | |
| 7,091,859 | B2 | * | 8/2006 | Duron et al. | 340/572.1 |
| 7,501,952 | B2 | * | 3/2009 | Forster | 340/572.1 |
| 7,639,119 | B2 | * | 12/2009 | Carrender et al. | 340/10.42 |
| 7,760,585 | B1 | * | 7/2010 | Ortiz et al. | 367/2 |
| 7,916,094 | B2 | | 3/2011 | Neto et al. | |
| 7,965,189 | B2 | | 6/2011 | Shanks et al. | |
| 7,969,286 | B2 | | 6/2011 | Adelbert | |
| 8,068,807 | B2 | * | 11/2011 | Twitchell, Jr. | 455/404.2 |
| 8,462,062 | B2 | * | 6/2013 | Westrick et al. | 343/731 |
| 2002/0021208 | A1 | * | 2/2002 | Nicholson et al. | 340/10.34 |
| 2002/0130778 | A1 | * | 9/2002 | Nicholson | 340/572.1 |
| 2004/0135691 | A1 | * | 7/2004 | Duron et al. | 340/572.7 |
| 2004/0174260 | A1 | * | 9/2004 | Wagner | 340/568.1 |
| 2004/0212480 | A1 | * | 10/2004 | Carrender et al. | 340/10.42 |
| 2006/0208899 | A1 | * | 9/2006 | Suzuki et al. | 340/572.7 |
| 2007/0077888 | A1 | | 4/2007 | Forster | |
| 2007/0080804 | A1 | * | 4/2007 | Hirahara et al. | 340/572.1 |
| 2007/0252777 | A1 | | 11/2007 | Hsu et al. | |
| 2009/0302972 | A1 | | 12/2009 | Osamura et al. | |
| 2010/0328043 | A1 | * | 12/2010 | Jantunen et al. | 340/10.3 |
| 2011/0309931 | A1 | | 12/2011 | Rose | |
| 2014/0015641 | A1 | * | 1/2014 | White | 340/10.1 |
| 2014/0015642 | A1 | * | 1/2014 | White | 340/10.1 |

OTHER PUBLICATIONS http://www.cdc.gov/niosh/mining/pubs/pdfs/umc.pdf, Jan. 1978.
"Remotely Powered Addressable UHF RFID Integrated System" by Curty et al., IEEE Journal of Solid-State Circuits, vol. 40, No. 11, Nov. 2005.

* cited by examiner

Primary Examiner — Brian Zimmerman
Assistant Examiner — An T Nguyen
(74) Attorney, Agent, or Firm — Nelson Adrian Blish

(57) ABSTRACT

A container group includes a plurality of containers arranged in three dimensions. A power signal is transmitted to a first subset of the containers facing a power antenna. A data signal is transmitted to a second subset of the containers facing a link antenna. The power and link antennas face non-parallel sides of the container. The containers pass power back from the first subset. The power transmitted to each container runs an RFID repeater that passes data back from the second subset. In the container group is a masked container with an RFID tag that communicates with the RFID repeater on the next container closer to the link antenna.

8 Claims, 7 Drawing Sheets

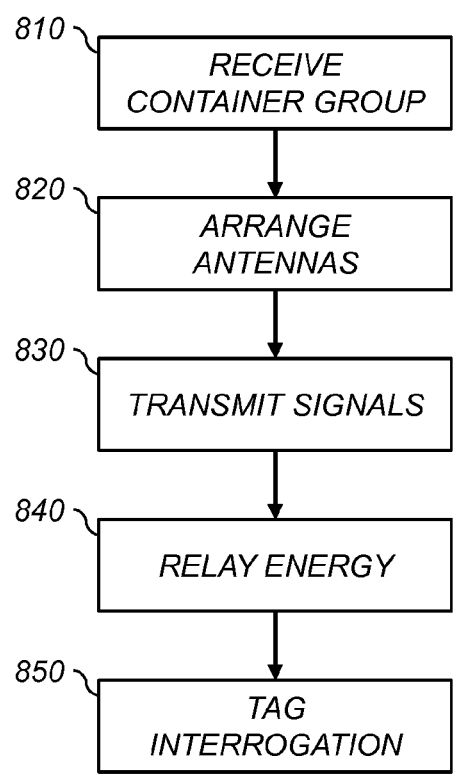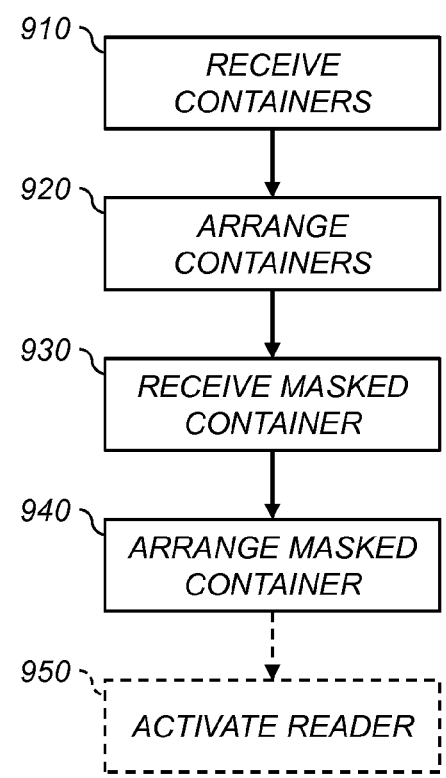

MASKED CONTAINER RFID TAG COMMUNICATIONS SYSTEM

CROSS REFERENCE TO RELATED APPLICATIONS

Reference is made to commonly-assigned U.S. patent application Ser. No. 13/549,615 (now U.S. Publication No. 2014/0015642), filed Jul. 16, 2012, entitled COMMUNICATING WITH RFID TAGS ON MASKED CONTAINERS, by White; the disclosure of which is incorporated herein.

FIELD OF THE INVENTION

This invention pertains to the field of radio-frequency communication between radio-frequency identification (RFID) tags and RFID readers, and more particularly to such communications with tags on containers in a container group.

BACKGROUND OF THE INVENTION

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), 2.4 GHz, or 5.8 GHz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative. RFID readers and tags can communicate using, e.g., the EPC Class-1 Generation-2 UHF RFID Protocol for Communications at 860 MHz-960 MHz, Version 1.2.0, Oct. 23, 2008, incorporated herein by reference.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 (Adelbert), and in U.S. Pat. No. 6,725,014 (Voegele), both of which are incorporated herein by reference.

In a commercial or industrial setting, tags can be used to identify containers of products used in various processes. A container with a tag affixed thereto is referred to herein as a "tagged container." Tags on containers can carry information about the type of products in those containers and the source of those products. For example, as described in the GS1 EPC Tag Data Standard ver. 1.6, ratified Sep. 9, 2011, incorporated herein by reference, a tag can carry a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process. However, when containers are palletized or otherwise grouped into a container group, e.g., a unit load, the containers or instances therein can attenuate RF energy to the extent that an RFID reader cannot read the RFID tags on all the containers in the unit load. Containers can be cases, boxes, flats, or ISO shipping containers; container groups can be formed on pallets, in air-freight unit-load devices, or on the decks of ships.

U.S. Patent Publication No. 2009/0302972 (Osamura et al.) describes arranging an RFID electromagnetic coupling module in the lumen of a piece of corrugated board. The material of the board is a dielectric and the dielectric and the module are electromagnetically coupled. However, "Radio Frequency Identification (RFID) Power Budgets for Packaging Applications" by Adair (Nov. 30, 2005) Table 2 (pg. 6) describes that attaching an RFID antenna to cardboard introduces not quite −1 dB of gain (at 915 MHz) compared to an antenna in free space under the tested conditions. This suggests that the cardboard described by Adair does not enhance RF propagation. Further information about measuring attenuation due to objects is described in "Radio Link Budgets for 915 MHz RFID Antennas Placed On Various Objects" by Griffin et al. (presented at the WCNG Wireless Symposium, Austin Tex., October 2005), and by "RF Tag Antenna Performance on Various Materials Using Radio Link Budgets" (*IEEE Antennas and Wireless Propagation Letters*, December 2006). The disclosures of Adair and the two Griffin documents are incorporated herein by reference.

The contents of a container can have a significant effect on RF communications. Adair Table 2 also reports that tested ground beef, for example, introduced −7.4 dB of gain. Adair Table 3 describes that a representative passive tag can have a downlink power margin of 7 dB at a distance of 3 m. Consequently, placing a tag on a container filled to the edges with ground beef can consume the entire power margin of the RFID tag, rendering the reader unable to read the tag at 3 m.

Material around the container can also have a significant effect. An example in Adair Table 4 describes a power margin of only 1.4 dB for reading a tag on a cardboard container adjacent to a wood pallet at 3 m. Since containers are often grouped together, e.g., on pallets, the contents of containers on the outside of the group ("outward-container tags") will attenuate or deflect RFID signals and prevent those signals from reaching tags on containers on the inside of the group. There is, therefore, a continuing need for ways of transmitting RFID signals to such tags, referred to herein as "masked-container" tags.

Various ways of conveying RF signals have been described. U.S. Pat. No. 7,916,094 (Neto et al.) describes a leaky-wave broadband antenna positioned at the surface of a dielectric body. In the described configuration, the difference in dielectric constant between the body and the surrounding air causes signals to be transmitted at a known angle with respect to the surface. However, this antenna requires two large (relative to the antenna) volumes of approximately uniform dielectric constant adjacent to the antenna. RFID tags on or within corrugated containers do not have access to such volumes. Moreover, even if a tag were oriented to use the contents of a container as one of the volumes, the antenna design would have to be adjusted for each dielectric constant of product encountered. One antenna design could not be used for multiple, different products, and containers could not be reused to hold different products at different times throughout their lives without replacing the tag.

U.S. Patent Publication No. 2007/0077888 (Forster) describes an RFID transmitter connected to a leaky-feeder cable. The leaky-feeder cable has openings in its shield at various points along its length. RF energy escapes the cable through those openings and can energize nearby RFID tags. Forster describes all the RFID tags replying to a single receiver, and doing so without using the leaky-feeder cable. However, this scheme would still require a cable to be threaded through a load of containers on a pallet to attempt RFID communications with masked-container tags. Installing such a cable to reach all the masked-container tags would require a complicated routing path and would increase the volume occupied by the container group. Moreover, the cable would have to be removed at the unloading point, and recycling or discard issues would have to be managed.

Furthermore, leaky-feeder communications require free space through with RF can propagate. Reference is made to Murphy and Parkinson, "Underground Mine Communications", *Proc. IEEE* 66:1 (January 1978), pp. 26-50, and to U.S. Patent Publication No. 2007/0252777 (Hsu et al.), both incorporated herein by reference. Murphy sec. III.D, pp. 38-40, and sec. IV.C., pp. 43-45, describe leaky-feeder cable systems used in mining applications. In masked-container RFID communications, unlike mines, not enough free space is available to support a significant monofilar mode (return current carried by walls of the confined space; relatively higher radiation than bifilar propagation modes). There is, therefore, a need for a different way of permitting RFID readers to communicate with masked-container tags.

U.S. Patent Publication No. 2011/0309931 (Rose) describes RFID readers that communicate wirelessly to a server. It is also known for RFID readers to communicate with each other by non-RFID wireless standards or protocols. Although the scheme of Rose may reduce the burden of wiring RFID readers in, e.g., a large factory or shipping dock, it does not provide improved RF communications with objects obscured from an RFID reader by other objects.

U.S. Pat. No. 7,075,437 (Bridgelall et al.) describes an RFID relay device including two antennae coupled by a transmission line. An impedance adjusting circuit is also coupled to the transmission line. The antennas can be on different walls of a container, and a signal transmitted by an antenna on a first container is received by a first antenna on a second container and retransmitted by a second antenna on the second container. However, the antennas in this scheme would still be affected by RF interference from products close to the walls of the container. Moreover, this scheme requires careful control of the impedances of the antennas, the transmission lines, and any RFID tags that may be attached to the transmission lines, to maintain power transmission through a stack of containers. There is also, therefore, a continuing need for a way to carry RF energy through a container group with reduced attenuation.

SUMMARY OF THE INVENTION

According to an aspect of the present invention, there is provided an RFID system for communicating with a masked-container RFID tag in a container group, the system comprising:

a) an RFID reader spaced apart from the container group;

b) the container group including a outward container and a masked container having the masked-container RFID tag, the container group and reader arranged so that the outward container attenuates communications propagating along a line between the RFID reader and the masked-container RFID tag;

c) wherein the outward container includes an upstream antenna, an RFID repeater having an energy-supply unit that provides energy to the RFID repeater, and a downstream antenna, and the masked container includes an upstream antenna arranged with respect to the downstream antenna of the outward container to wirelessly communicate therewith;

d) so that:

when the RFID repeater receives a downlink signal from the RFID reader via the upstream antenna of the outward container, the RFID repeater transmits a corresponding downlink signal via the downstream antenna of the outward container so that the masked-container RFID tag receives the corresponding downlink signal via the upstream antenna of the masked container; and when the masked-container RFID tag transmits an uplink signal via the upstream antenna of the masked container, the RFID repeater receives the uplink signal via the downstream antenna of the outward container and transmits a corresponding uplink signal via the upstream antenna of the outward container so that the RFID reader receives the corresponding uplink signal.

According to another aspect of the present invention, there is provided, in an RFID system including an RFID reader and a container group including a plurality of containers arranged in three dimensions, the improvement comprising:

the RFID reader including a power-supply antenna and a link antenna, each spaced apart from the container group, the plurality of containers including one or more power-supply containers facing the power-supply antenna and one or more data containers facing the link antenna;

the RFID reader adapted to transmit a power-supply RF signal via the power-supply antenna to a the power-supply containers and to transmit a data RF signal via the link antenna to a the data containers while transmitting the power-supply RF signal;

each of the plurality of containers including a power-supply relay and a data relay, each relay including an upstream antenna arranged on a side of the container facing the corresponding antenna of the RFID reader and a downstream antenna arranged on a side of the container facing away from the corresponding antenna of the RFID reader;

the containers arranged so that the upstream power-supply antenna of each container other than the power-supply containers is adjacent to the downstream power-supply antenna of another of the containers, and the upstream data antenna of each container other than the data containers is adjacent to the downstream data antenna of another of the containers;

each power-supply relay adapted to receive RF energy via its upstream antenna, transmit some of the received energy via its downstream antenna, and provide some of the received RF energy to the respective data relay;

each data relay adapted to relay RF energy between its upstream and downstream antennas using the RF energy received from the respective power-supply relay; and the container group further including a masked container including an RFID tag adapted to receive RF signals and transmit RF responses and an antenna coupled to the RFID tag, the masked container oriented so that the antenna thereof is adjacent to the downstream data antenna of one of the plurality of containers;

so that the data RF signal from the RFID reader is retransmitted by at least one of the data containers to the RFID tag, and a response signal from the RFID tag is retransmitted by at least one of the data containers to the link antenna of the RFID reader.

An advantage of this invention is that it provides RFID communications with RFID tags on masked containers. Various aspects provide such communications using standard reader and tag antennas and configurations. Various aspects use the same frequency band for power and data, simplifying installation and operation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 8 shows methods of using an RFID reader to communicate with an RFID tag of a masked container; and FIG. 9 shows methods of arranging a plurality of containers in three dimensions to form a container group permitting RFID communication with an RFID tag of a masked container in the container group.

The attached drawings are for purposes of illustration and are not necessarily to scale.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

In the following description, some aspects will be described in terms that would ordinarily be implemented as software programs. Those skilled in the art will readily recognize that the equivalent of such software can also be constructed in hardware. Because data-manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various aspects is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various aspects.

Figure 1:
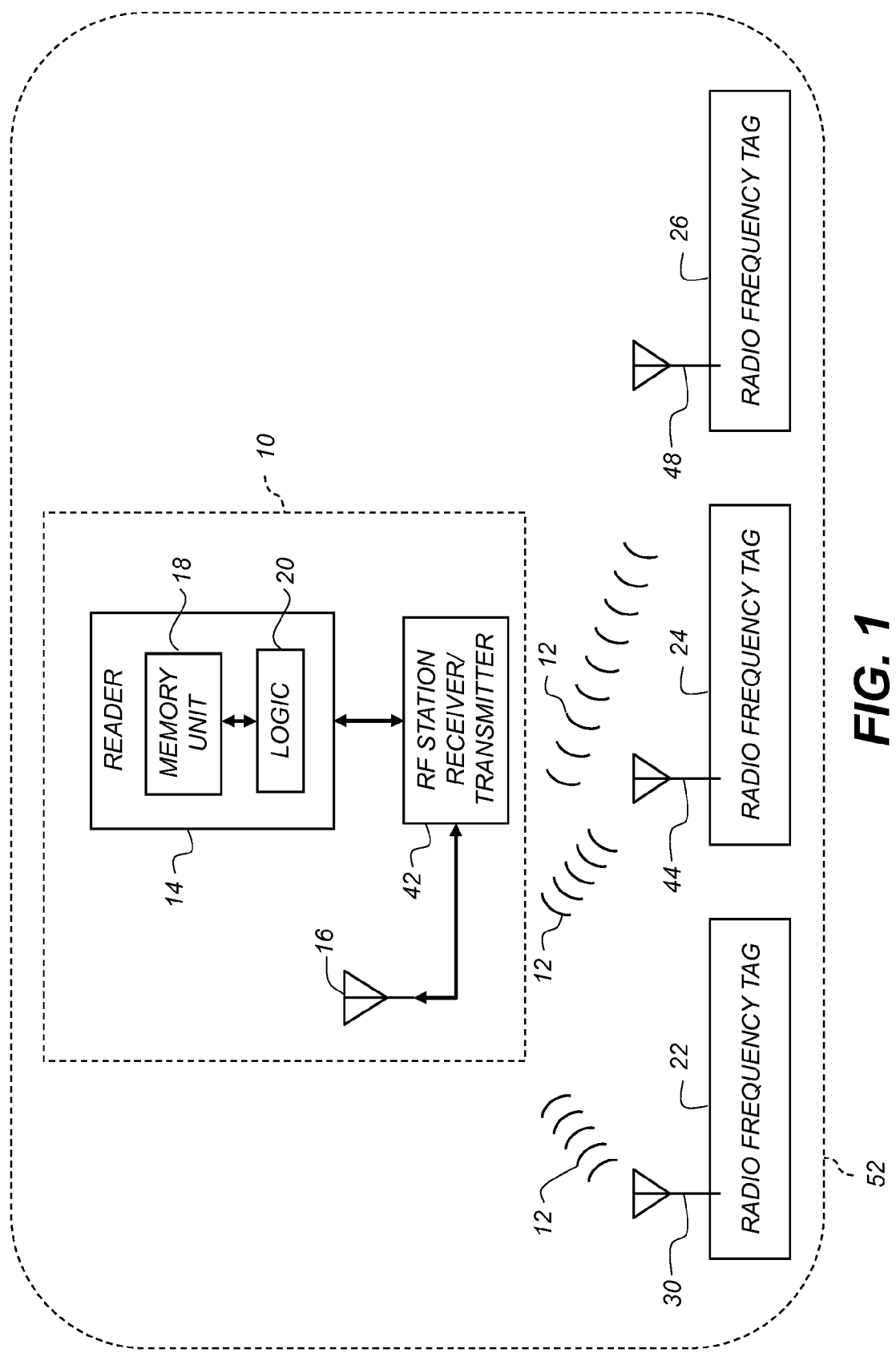
FIG. 1 is a block diagram of an RFID system according to various embodiments.

FIG. 1 is a block diagram of an RFID system according to various aspects. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SG TINS of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52.

Figure 2:
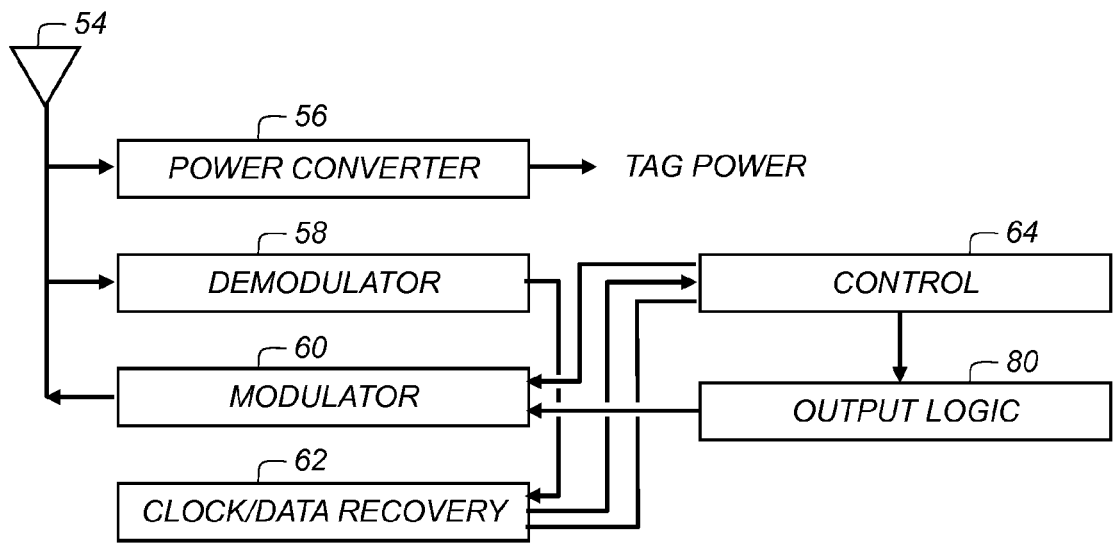
FIG. 2 is a block diagram of a passive RFID tag according to various embodiments.

FIG. 2 is a block diagram of a passive RFID tag (e.g., tags 22, 24, 26 according to an aspect of the system shown in FIG. 1) according to various aspects. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various aspects, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another aspect, modulator 60 connects and disconnects a load capacitor across the antenna in the time sequence. Further details of passive tags and backscatter modulation are provided in U.S. Pat. No. 7,965,189 (Shanks et al.) and in "Remotely Powered Addressable UHF RFID Integrated System" by Curty et al., IEEE Journal of Solid-State Circuits, Vol. 40, No. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
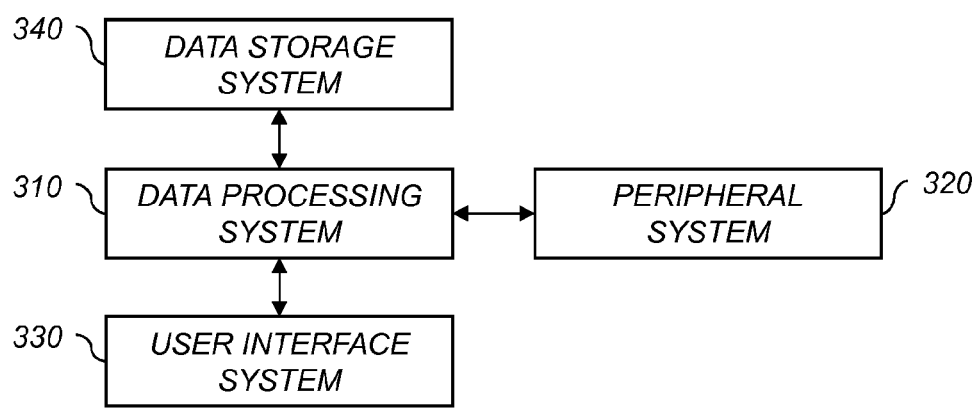
FIG. 3 is a high-level diagram showing the components of a processing system useful with various embodiments.

FIG. 3 is a high-level diagram showing the components of a processing system useful with various aspects. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various aspects, including the example processes described herein. The phrases "data processing device" or "data processor" are intended to include any data processing device, such as a central processing unit (CPU), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various aspects. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, compact discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
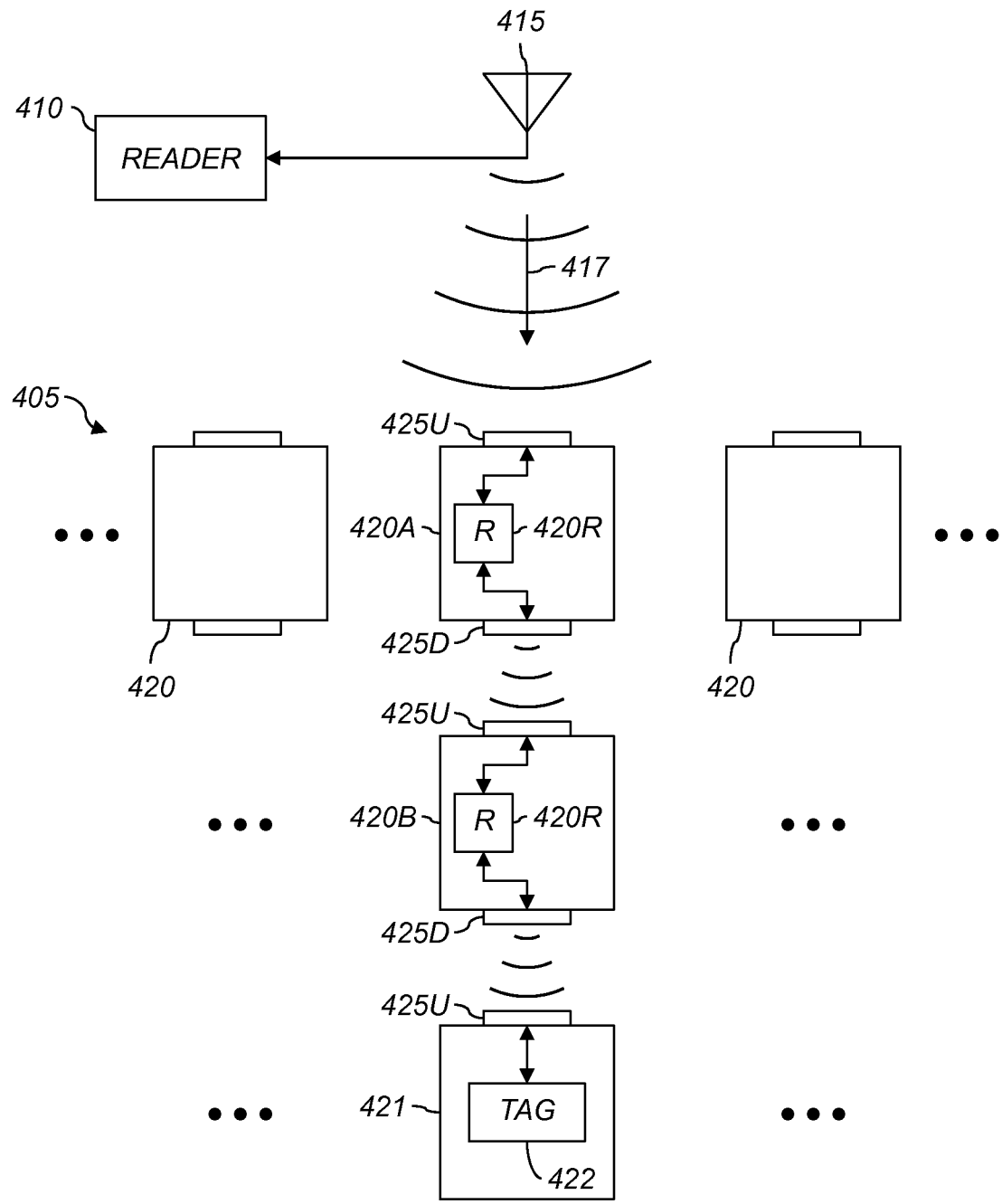
FIG. 4 is a plan of an RFID system.

FIG. 4 is a plan of an RFID system for communicating with masked-container RFID tag 422 in container group 405. Container group 405 includes a number of containers, of which five are shown. RFID reader 410 is spaced apart from container group 405. The location of RFID reader 410 is defined to be the location of its link antenna 415. Therefore, references herein to the location of the "RFID reader" (410) refer to the location of link antenna 415. Consequently, antenna 415 of RFID reader 410 is spaced apart from container group 405.

Container group 405 includes outward containers 420, 420A, 420B and masked container 421 having masked-container RFID tag 422. Container group 405 and link antenna 415 are arranged so that at least one of the outward containers (here, outward containers 420A, 420B) attenuates communications propagating along direction 417 between RFID link antenna 415 and masked-container RFID tag 422.

Each outward container 420A, 420B includes upstream antenna 425U, RFID repeater 420R (discussed below), and downstream antenna 425D. Upstream antenna 425U and downstream antenna 425D are each bidirectional; "upstream" is closer to link antenna 415 in the signal path and "downstream" is farther therefrom. Masked container 421 includes upstream antenna 425U arranged with respect to downstream antenna 425D of outward container 420B to wirelessly communicate therewith. As a result, when RFID repeater 420R receives a downlink signal from RFID reader 410 via upstream antenna 425U of outward container 420B, RFID repeater 420R transmits a corresponding downlink signal via downstream antenna 420D of outward container 420B so that masked-container RFID tag 422 receives the corresponding downlink signal via upstream antenna 425U of masked container 421. Likewise, when masked-container RFID tag 422 transmits an uplink signal via upstream antenna 425U of masked container 421, RFID repeater 420R of outward container 420B receives the uplink signal via downstream antenna 425D of outward container 420B and transmits a corresponding uplink signal via upstream antenna 425U of outward container 420B so that RFID reader 410 receives the corresponding uplink signal. Upstream antenna 425U and downstream antenna 425D of outward container 420B can be arranged on opposed sides of outward container 420B, or adjacent sides.

In various examples, such as those shown here, outward containers 420A, 420B are stacked more than one deep with respect to masked container 421. Specifically, second outward container 420A has upstream antenna 425U, RFID repeater 420R, and downstream antenna 425D. Container group 405 is arranged so that second outward container 420A receives a second downlink signal from RFID reader 410 via upstream antenna 425U of second outward container 420A and transmits the downlink signal to RFID repeater 420R of outward container 420B via downstream antenna 425D of second outward container 420A. Likewise, second outward container 420A receives the corresponding uplink signal from RFID repeater 420R in outward container 420B via downstream antenna 425D of second outward container 420A and transmits a second corresponding uplink signal to RFID repeater 420R via upstream antenna 425U of second outward container 420A. Signals can be repeated through any number of outward containers 420A, 420B to reach masked container 421. Any number (including zero) of other outward containers 420 can be present but not participate in communications with masked-container RFID tag 422.

In various examples, downstream antenna 425D of outward container 420B and upstream antenna 425U of masked container 421 include respective loops, and RFID repeater 420R and masked-container RFID tag 422 communicate using inductive coupling between antennas 425D, 425U. This communication can use RF signals at one or more frequencies less than 100 MHz.

In this plan view, the top and bottom of container 420A are not visible. Container 420A is a rectangular prism, and the four visible sides are upstream face 535U, downstream face 535D, upstream power face 536U, and downstream power face 536D. These are discussed below. In various examples, the respective upstream power face 536U of outward container 420A is substantially orthogonal (e.g., 60°-120°) to upstream face 535U of container 420A.

In various examples, container 420A includes sides (e.g., those with faces 535U, 535D) having respective lumens (represented here as continuous lumen 525L around all four visible sides), and RFID repeater 420R is arranged in the lumen (s) of one or more side(s) of container 420A. For example, repeater 420R can be arranged within the walls of a corrugated cardboard box.

Figure 5:
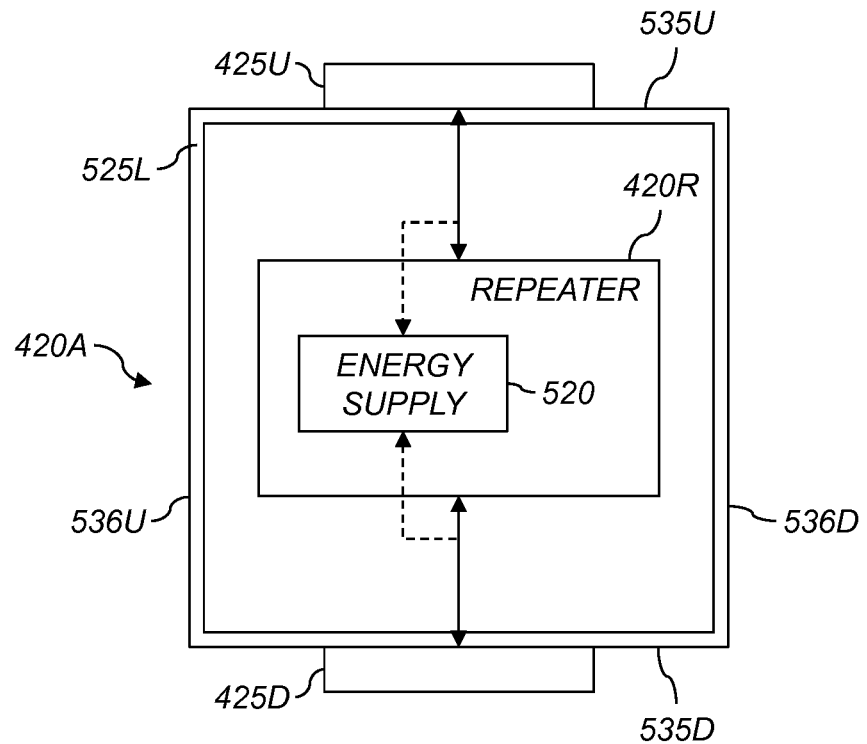
FIG. 5 is a plan of details of an outward container.

FIG. 5 is a plan of details of outward container 420A according to various examples. Upstream antenna 425U and downstream antenna 425D are as shown in FIG. 4. RFID repeater 420R includes energy-supply unit 520 that provides energy to RFID repeater 420R. Energy-supply unit 520 can include a battery, solar cell, RF-energy harvester, or other energy harvester, e.g., motion or vibration harvester. RFID repeater 420R uses the energy to repeat, i.e., retransmit or amplify, signals between downstream antenna 425D and upstream antenna 425U in either direction. In various examples, energy-supply unit 520 includes an RF-harvesting device that extracts energy from RF signals received via downstream antenna 425D or upstream antenna 425U and provides the extracted energy to RFID repeater 420R.

In various examples, RFID repeater 420R communicates via upstream antenna 425U and downstream antenna 425D of outward container 420A in respective, different frequency bands. Each band can be a single frequency, e.g., for CW, or a range of frequencies. In some of these examples, energy-supply unit 520 includes an RF-harvesting device that extracts energy from RF signals received via downstream antenna 425D or upstream antenna 425U (shown) and provides the extracted energy to RFID repeater 420R. In some of these examples, the RF-harvesting device extracts energy from RF signals in a different frequency band than the respective, different frequency bands used for communication with antennas 425U, 425D. For example, antennas 425U, 425D can operate in different channels of the 2.4 GHz RFID standard, and RF-harvesting device can extract energy from extremely-low frequency (ELF, e.g., <300 Hz) RF radiation. In some of these examples, the RF-harvesting device transmits via downstream antenna 425D some of the energy received via upstream antenna 425U, or transmits via upstream antenna 425U some of the energy received via downstream antenna 425D.

Figure 6:
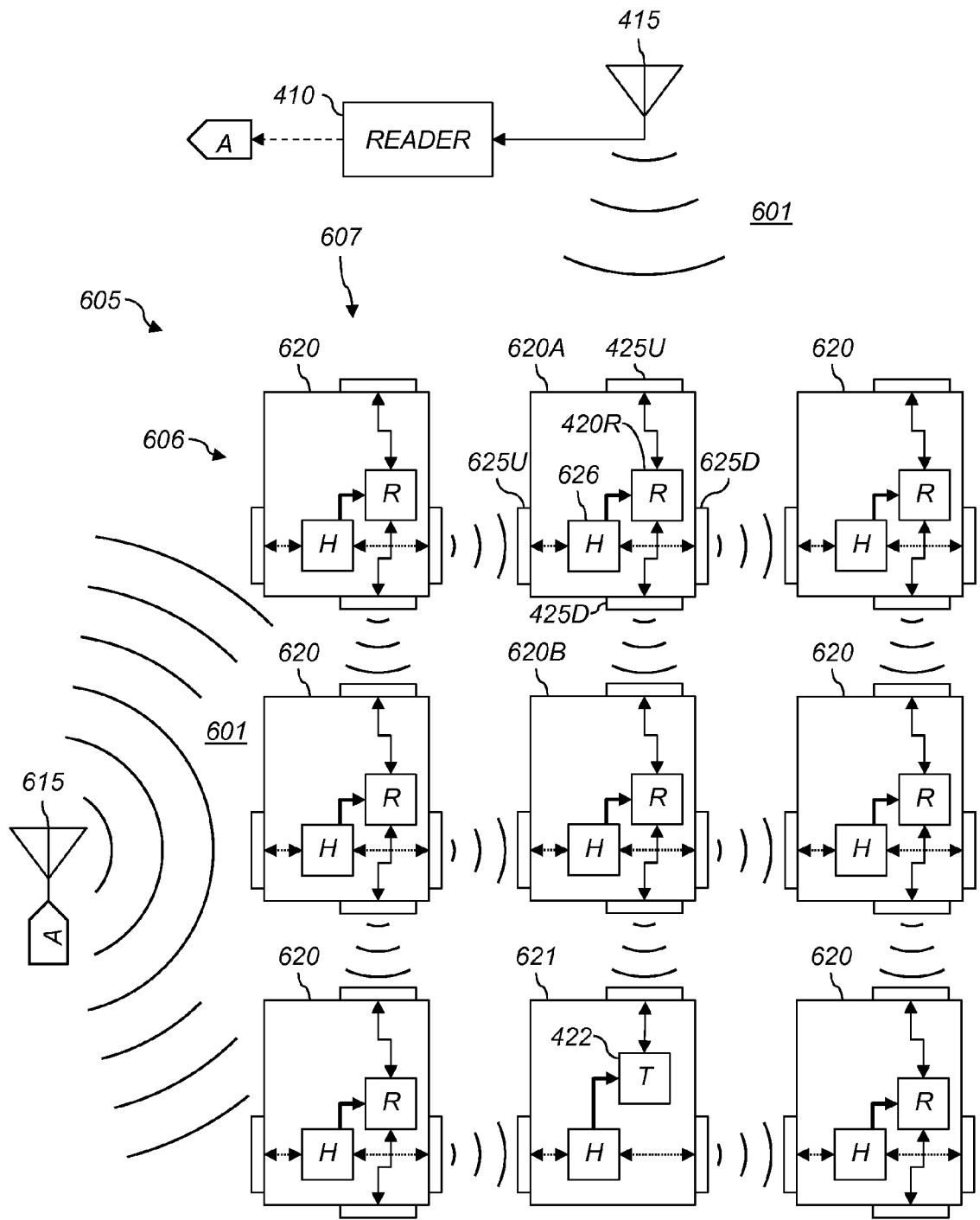
FIG. 6 is a plan of an RFID system for communicating with a masked-container RFID tag in a container group.

FIG. 6 is a plan of an RFID system for communicating with masked-container RFID tag 422 in container group 605. Container group 605 includes a plurality of containers 620, 620A, 620B, 621, including masked container 621 and outward container 620B. Outward containers 620, 620A, 620B each include respective upstream antennas 425U respective downstream antennas 425D, and respective RFID repeaters 420R, as described above. For clarity, the antennas and other parts are labeled only on outward container 620A.

Each upstream antenna 425U is arranged on, i.e., is on, in, disposed over, or embedded in, an upstream face of container 620, 620A, 620B, 621. Each downstream antenna 425D is arranged on a downstream face container 620, 620A, 620B. Masked container 621 can also include a downlink antenna or RFID repeater (not shown). Containers 620, 620A, 620B, 621 are arranged in container group 605 so that the respective upstream faces of each container 620, 620A, 620B, 621 in container group 605 are oriented substantially the same, and the respective downstream faces of each container 620, 620A, 620B, 621 in plurality of containers 605 are oriented substantially the same. In an example, the respective normals to the upstream faces are within ° of each other, as are the respective normals to the downstream faces. This permits signals to be repeated from downstream antenna to upstream antenna (or vice-versa) to reach each container 620, 620A, 620B, 621 in container group 605. RFID reader 410 includes antenna 415 arranged to communicate through free space 601 between antenna 415 and container group 605 with the respective upstream faces of a first selected group 606 of at least one, but less than all, of the containers in the plurality of containers. Here, link antenna 415 communicates with the top three containers 620, 620A. The upstream faces of the containers in the selected group are adjacent to free space 601.

In various of these examples, each container 620, 620A, 620B, 621 includes a respective upstream power antenna 625U arranged on a respective upstream power face of the container 620, 620A, 620B, 621, and a respective downstream power antenna 625D on or in a respective downstream power face of the container 620, 620A, 620B, 621 opposite the respective upstream face of the container 620, 620A, 620B, 621. Each energy-supply unit (unit 520, FIG. 5) includes a respective RF-harvesting device 626 that extracts energy from RF signals received via downstream power antenna 625D or upstream power antenna 625U and provides the extracted energy to RFID repeater 420R. For clarity in the figure, repeater 420R connections are shown as solid lines, RF-harvesting connections are shown as broken lines, and the supply of energy from RF-harvesting device 626 to RFID repeater 420R is shown as a heavy solid line. In each container 620, 620A, 620B, 621, the respective upstream and downstream power antennas 625U, 625D, or the respective RF-harvesting devices 626, are arranged so that at least some of the energy received via upstream antenna 625U is transmitted via downstream antenna 625D. As discussed above with reference to FIG. 4, the upstream face and upstream power face are substantially orthogonal. This permits transmitting data and power through container group 605 substantially orthogonal to each other, significantly reducing interference between the two.

In various examples, each RFID repeater 420R transmits or receives signals in a link frequency band (that includes uplink and downlink frequencies), and RF-harvesting device 626 extracts energy from RF signals in a power frequency band different from the link frequency band. This permits transmitting power to the RFID repeaters in a band not significantly attenuated by objects in containers 620, 620A, 620B, 621. Lower-attenuation power transmission permits operating repeaters 420R at high enough powers and low enough receive sensitivities that link frequency bands that are attenuated by objects in containers 620, 620A, 620B, 621 can be used. This permits using standard RFID frequencies, e.g., in the 2.4 GHz band, to communicate even between containers holding substantial amounts of water or other materials that absorb a significant amount of 2.4 GHz radiation. R-F harvesting device 626 can also extract energy from RF signals in the link frequency band, which permits using power-harvesting techniques commonly used in RFID tags to extract the energy.

In various examples, each container 620, 620A, 620B, 621 includes a respective set of six faces. For convenience only, these faces are referred to herein as top, bottom, left, right, front, and back faces. No particular orientation is required for any of these faces; the names are used for comprehension. For each container 620, 620A, 620B, 621, the upstream face is the front face, the downstream face is the back face, the upstream power face is the left face, and the downstream power face is the right face. In various examples, upstream antenna 425U, RFID repeater 420R, and downstream antenna 425D are connected via the top face or bottom face. Upstream power antenna 625U and downstream power antenna 625D are correspondingly connected via the bottom face or top face. In addition to this wrapping around opposite faces, connections can also wrap around the same face and cross (or not). Connections can also be made using vertically-stacked wraparounds, e.g., front and back faces being connected by a trace on the left face, while left and right faces are connected by a trace around the back face below downstream antenna 425D.

In the example shown, RFID reader 410 includes link antenna 415 and power antenna 615. Each antenna 415, 615 is arranged with respect to container group 605 to permit transfers through free space 601. Specifically, RFID reader 410 communicates using link antenna 415 through free space between link antenna 415 and container group 605 with the respective upstream faces of a first selected group 606 (here, the top row) of at least one, but less than all, of the containers 620, 620A, 620B in the plurality of containers. The upstream faces of the containers 620, 620A, 620B in first selected group 606 are adjacent to free space 601. RFID reader 410 also transmits using power antenna 615 through free space 601 between power antenna 615 and container group 605 with the respective upstream power faces of a second selected group 607 (here, the left column) of at least one, but less than all, of the containers 620 in the plurality of containers. The upstream faces of containers 620 in the second selected group 607 are adjacent to free space 601.

In various examples, each RFID repeater 420R transmits or receives signals in a link frequency band (including uplink and downlink) and each RF-harvesting device 626 extracts energy from RF signals in the link frequency band. This permits transmitting both power and signal on the same band, so the same antenna and circuit designs can be used. The power and signal are transmitted orthogonally (e.g., with central axes of propagation at 90° angles to each other, or between 60° and 120°). In some of these examples, each container 620, 620A, 620B, 621 includes one or more instances of a product, and each instance attenuates RF signals in the link frequency band. (For example, the instances can be bottles of VITAL ENERGY drink, which has a water base. Water strongly attenuates microwaves, e.g., in the 2.4 GHz RFID band.) Consequently, the instances physically define narrow RF corridors, e.g., through the sidewalls of containers 620, 620A, 620B, 621, in which RF energy can propagate without the significant attenuation the RF energy experiences when passing through the instances. Transmitting power through one pair of opposed sides of each container and signal through a different pair of opposed sides of each container advantageously separates the RF power and signal energy mechanically. The instances reduce crosstalk between the power antennas and the signal antennas. Prior systems have been directed to transmissions strong enough to, with assistance, bypass or overcome the attenuation of the contained instances on closely-spaced containers on, e.g., a pallet. The inventive examples discussed herein use the attenuation provided by the instances to enhance the channeling of RF energy provided by the antenna pairs. This advantageously permits using a standard, single frequency band, and a single antenna design, to transmit power to RFID repeaters 420R to transport signals from link antenna 415 through container group 605 and back.

The techniques described above are also applicable to an RFID system including RFID reader 410 and container group 605 including a plurality of containers 620, 620A, 620B, 621 arranged in three dimensions. That is, the containers can be adjacent to each other along three different, non-parallel directions. FIG. 6 shows one layer of such a container group, which would thus include multiple stacked layers. For example, container group 605 can be a three-dimensional container group.

Figure 7:
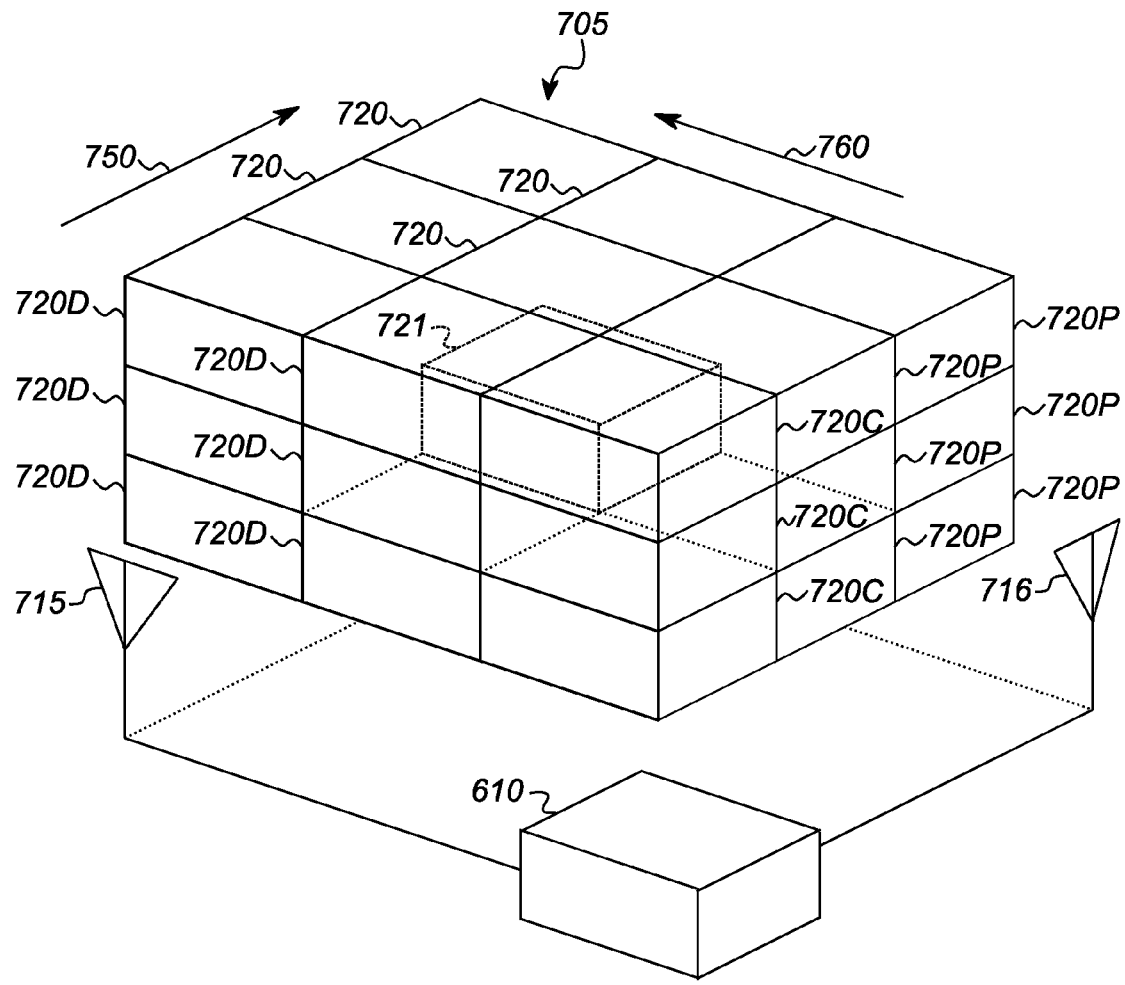
FIG. 7 is an isometric view of three-dimensional container group.

FIG. 7 is an isometric view of three-dimensional container group 705. Only outward containers 720, 720C, 720D, 720P are visible to the naked eye (assuming containers 720, 720C, 720D, 720P are not transparent). Masked container 721 is indicated within group 705 by dashed lines, with dotted lines to provide perspective. RFID reader 410 includes power-supply antenna 716 and link antenna 715, each spaced apart from the container group, the plurality of containers including one or more power-supply containers 720P facing the power-supply antenna and one or more data containers 720D facing the link antenna. "Facing" refers to being oriented to receive RF transmissions from the corresponding antenna through free space, those transmissions not passing through other containers of the container group on the way from the antenna to a container facing the antenna. Containers 720C are both power-supply containers and data containers. Containers 720, 720C, 720D, 720P have uplink, downlink, uplink power, and downlink power antennas as described above with reference to containers 620, 620A, 620B (FIG. 6); they are omitted here for clarity. Masked container 721 has antennas as described above for container 621 (FIG. 6), also omitted here for clarity.

RFID reader 610 transmits a power-supply RF signal via power-supply antenna 716 to power-supply containers 720C, 720P. While transmitting the power-supply RF signal, RFID reader 610 transmits a data RF signal via link antenna 715 to data containers 720C, 720D.

Each of the plurality of containers 720, 720C, 720D, 720P includes a power-supply relay and a data relay, described below. Each relay includes an upstream antenna arranged on a side of the container facing the corresponding antenna of RFID reader 610 and a downstream antenna arranged on a side of the container facing away from the corresponding antenna of RFID reader 610 (i.e., the normal at the center of the downstream antenna to the side facing away from the corresponding antenna is separated by less than 90° from the vector from the antenna to the center of the downstream antenna). Containers 720, 720C, 720D, 720P are arranged so that the upstream power-supply antenna of each container other than the power-supply containers 720C, 720P is adjacent to the downstream power-supply antenna of another of the containers 720, 720C, 720P, and the upstream data antenna of each container other than the data containers 720C, 720D is adjacent to the downstream data antenna of another of the containers 720, 720C, 720D. Each power-supply relay is adapted to receive RF energy via its upstream antenna, transmit some of the received energy via its downstream antenna, and provide some of the received RF energy to the respective data relay. Each data relay is adapted to relay RF energy between its upstream and downstream antennas using the RF energy received from the respective power-supply relay. In various aspects, the data relay is an active bidirectional repeater.

Masked container 721 in the container group has an RFID tag adapted to receive RF signals and transmit ("transmit" can include backscattering) RF responses. Masked container 721 also includes an antenna coupled to the RFID tag, the masked container oriented so that the antenna thereof is adjacent to the downstream data antenna of one of the plurality of containers 720, 720C, 720D, 720P. As a result, the data RF signal from RFID reader 610 is retransmitted by at least one of the data containers 720C, 720D to the RFID tag, and a response signal from the RFID tag is retransmitted by at least one of the data containers 720C, 720D to the link antenna of RFID reader 610. The data signals can transit any number of containers 720, 720C, 720D, 720P between the at least one of the data containers 720C, 720D and masked container 721.

Referring back to FIG. 6, in various aspects, each power-supply relay includes RF-harvesting device 626 and each data relay includes RFID repeater 420R. The respective upstream antennas are antennas 625U, 425U, and the respective downstream antennas are antennas 625D, 425D. In other aspects, each power-supply relay includes a conductor connecting the two antennas to relay energy between the upstream and downstream power antennas. A wire connected to, or placed adjacent to, the conductor permits extracting power by conduction or induction, respectively. Capacitive coupling can also be used.

Referring back to FIG. 7, in various aspects, at least one of the containers 720, 720C, 720D, 720P relays power (RF energy) or link data (the data RF signal) to more than one container downstream of it ("fan-out"). In various aspects, at least one of the containers 720, 720C, 720D, 720P receives power or link data relayed from more than one container upstream of it ("fan-in"). Fan-in and fan-out can be within a horizontal layer of the group of containers, between layers, or a combination. For example, in a container group of packed rectangular prisms, each container is adjacent to 26 others. A container can fan-out to, or fan-in from, the nine containers of those 26 that are downstream of it (in either power direction 760 or link direction 750, or both). Fan-out and fan-in advantageously increase the robustness of the system against misalignments of containers within group 705. In an example, each container 720P transmits, via the respective power relay, RF energy from antenna 716 to a plurality of containers 720. In other example, each container 720C transmits RF energy from antenna 716 to one of the containers 720D and to masked container 721.

In various aspects, each data relay transmits or receives signals in a link frequency band (including uplink and downlink) and each power relay extracts energy from RF signals in the link frequency band. Transmitting power and signal on the same band permits using the same antenna and circuit design for both. As discussed above, attenuation from containers and instances can reduce crosstalk in these systems. In various aspects, each data relay transmits or receives signals in a link frequency band (including uplink and downlink) and each power relay extracts energy from RF signals in a power frequency band different from the link frequency band.

In various aspects, each container includes sides having respective lumens, and each respective data relay is arranged in the lumen(s) of one or more side(s) of the corresponding container.

In various aspects, each container includes a respective set of six faces, each set including top, bottom, left, right, front, and back faces, and, for each container, the upstream data antenna is arranged on the front face, the downstream data antenna is arranged on the back face, the upstream power-supply antenna is arranged on the right face, and the downstream power-supply antenna is arranged on the left face. In various aspects, the upstream data antenna, data relay, and downstream data antenna are connected via the top face or bottom face, and the upstream power-supply antenna and downstream power-supply antenna are correspondingly connected via the bottom face or top face.

FIG. 8 shows methods of using an RFID reader to communicate with an RFID tag of a masked container. The masked container is located in a container group including a plurality of containers arranged in three dimensions. Processing begins with step 810.

In step 810, the container group, including the masked container and the plurality of containers, is received. Step 810 is followed by step 820.

In step 820, a power-supply antenna and a link antenna of the RFID reader are arranged spaced apart from the container group. The antennas are oriented to transmit signals to a power-supply subset and a data subset, respectively, of the plurality of containers. The subsets can overlap. Step 820 is followed by step 830.

In step 830, the RFID reader transmits a power-supply RF signal via the power-supply antenna to the power-supply subset and transmits a data RF signal via the link antenna to the data subset while transmitting the power-supply RF signal. Step 830 is followed by step 840.

In step 840, the containers relay RF energy from the power-supply RF signal through the container group in a power-supply direction (e.g., direction 760, FIG. 7) via upstream and downstream power-supply antennas on each container. The containers also relay RF energy from the data RF signal through the container group in upstream and downstream data directions (e.g., downstream direction 750, FIG. 7) via upstream and downstream data antennas on each container. The upstream and downstream directions are each different from the power-supply direction. The RF energy from the data RF signal is relayed by a respective repeater on each container, and each repeater is powered by RF energy received through the respective upstream power-supply antenna. In various aspects, signals are transmitted or received in a link frequency band (including uplink and downlink) using the data antennas. Energy is extracted from RF signals in the link frequency band received via the downlink power-supply antenna. As discussed above, the containers and instances can reduce crosstalk. Step 840 is followed by step 850.

In step 850, the masked-container RFID tag receives RF energy from the downstream data antenna on one of the containers and transmits (or backscatters) a response RF signal to the downstream data antenna on the one of the containers, or on a different one of the containers. The data RF signal from the data antenna of the RFID reader is relayed by at least one of the containers in the data subset to the RFID tag, and the response RF signal from the RFID tag is relayed by at least one of the containers in the data subset to the link antenna of the RFID reader.

FIG. 9 shows methods of arranging a plurality of containers in three dimensions to form a container group permitting RFID communication with an RFID tag of a masked container in the container group. The container group is not solely a row or a flat stack one layer thick, but has containers arranged along three different, substantially mutually perpendicular axes. Processing begins with step 910.

In step 910, the plurality of containers is received. Each container includes a power-supply relay and a data relay, e.g., as discussed above with reference to FIGS. 6-7. Each relay includes an upstream antenna arranged on a side of the container facing a corresponding antenna of an RFID reader and a downstream antenna arranged on a side of the container facing away from the corresponding antenna of the RFID reader, as discussed above. Step 910 is followed by step 920.

In step 920, the containers are arranged so that the upstream power-supply antenna of each container other than the power-supply containers is adjacent to the downstream power-supply antenna of another of the containers, and the upstream data antenna of each container other than the data containers is adjacent to the downstream data antenna of another of the containers. Step 920 is followed by step 930.

In step 930, the masked container is received. The masked container has an RFID tag adapted to receive RF signals and transmit RF responses, and an antenna coupled to the RFID tag. Step 930 is followed by step 940.

In step 940, the masked container is arranged so that its antenna is adjacent to the downstream data antenna of one of the plurality of containers. At least one of the plurality of containers attenuates RF energy travelling from the link antenna of the RFID reader to the antenna of the masked container by at least 30 dB. Step 940 is followed by step 950.

In step 950, the RFID reader is activated to transmit a power-supply RF signal via the power-supply antenna to a power-supply subset of the plurality of containers and to transmit a data RF signal via the link antenna to a data subset of the plurality of containers while transmitting the power-supply RF signal. In various aspects, the power-supply RF signal and the data RF signal are transmitted in a common link-frequency band, as discussed above.

The invention has been described in detail with particular reference to certain preferred aspects thereof, but it will be understood that variations and modifications can be effected within the scope of the invention.

PARTS LIST 10 base station
12 air interface
14 reader
16 reader's antenna
18 memory unit
20 logic unit
22 RFID tag
24 RFID tag
26 RFID tag
30 antenna
42 RF station
44 antenna
48 antenna
52 range
54 antenna
56 power converter
58 demodulator
60 modulator
62 clock/data recovery circuit
64 control unit
80 output logic
310 data processing system
320 peripheral system
330 user interface system
340 data storage system
405 container group
410 RFID reader
415 link antenna
417 direction
420 outward container
420A outward container
420B outward container
420R RFID repeater
421 masked container
422 RFID tag
425D downstream antenna
425U upstream antenna
520 energy-supply unit
525L lumen
535D downstream face
535U upstream face
536D downstream power face
536U upstream power face
601 free space
605 container group
606 selected group
607 selected group
610 RFID reader
615 power antenna
620 outward container
620A outward container
620B outward container 621 masked container
625D downstream power antenna
625U upstream power antenna
626 RF-harvesting device
705 container group
715 link antenna
716 power-supply antenna
720 container
720C container
720D container
720P container
721 masked container
750 direction
760 direction
810 receive container group step
820 arrange antennas step
830 transmit signals step
840 relay energy step
850 tag interrogation step
910 receive containers step
920 arrange containers step
930 receive masked container step
940 arrange masked container step
950 activate reader step

The invention claimed is:

1. In an RFID system including an RFID reader and a container group including a plurality of containers arranged in three dimensions, the system comprising:
   the RFID reader including a power-supply antenna and a link antenna, each spaced apart from the container group, the plurality of containers including one or more power-supply containers facing the power supply antenna and one or more data containers facing the link antenna;
   the RFID reader adapted to transmit a power-supply RF signal via the power-supply antenna to a first subset of power-supply containers and to transmit a data RF signal via the link antenna to a first subset of data containers while transmitting the power-supply RF signal;
   each of the plurality of containers including a power-supply relay and a data relay, each relay including an upstream antenna arranged on a side of the container facing the corresponding antenna of the RFID reader and a downstream antenna arranged on a side of the container facing away from the corresponding antenna of the RFID reader;
   the containers arranged so that the upstream power-supply antenna of each container other than the first subset of power-supply containers is adjacent to the downstream power-supply antenna of another of the containers, and the upstream data antenna of each container other than the first subset of data containers is adjacent to the downstream data antenna of another of the containers;
   each power-supply relay adapted to receive RF energy via its upstream antenna, transmit some of the received energy via its downstream antenna, and provide some of the received RF energy to the respective data relay;
   each data relay adapted to relay RF energy between its upstream and downstream antennas using the RF energy received from the respective power-supply relay;
   the container group further including a masked container including an RFID tag adapted to receive RF signals and transmit RF responses and an antenna coupled to the RFID tag, the masked container oriented so that the antenna thereof is adjacent to the downstream data antenna of one of the plurality of containers; and
   so that the data RF signal from the RFID reader is retransmitted by at least one of the data containers to the RFID tag, and a response signal from the RFID tag is retransmitted by at least one of the data containers to the link antenna of the RFID reader.

2. The system according to claim 1, wherein each data relay transmits or receives signals in a link frequency band and each power-supply relay extracts energy from RF signals in the link frequency band.

3. The system according to claim 1, wherein each container includes sides having respective lumens, and each respective data relay is arranged in the lumen(s) of one or more side(s) of the corresponding container.

4. The system according to claim 1, wherein each data relay transmits or receives signals in a link frequency band and each power relay extracts energy from RF signals in a power frequency band different from the link frequency band.

5. The system according to claim 1, wherein each container includes a respective set of six faces, each set including top, bottom, left, right, front, and back faces, and, for each container, the upstream data antenna is arranged on the front face, the downstream data antenna is arranged on the back face, the upstream power-supply antenna is arranged on the right face, and the downstream power-supply antenna is arranged on the left face.

6. The system according to claim 5, wherein the upstream data antenna, data relay, and downstream data antenna are connected via the top face or bottom face, and the upstream power-supply antenna and downstream power-supply antenna are correspondingly connected via the bottom face or top face.

7. The system according to claim 1, wherein at least one of the containers is arranged to transmit RF energy or the data RF signal to more than one container downstream of it.

8. The system according to claim 1, wherein at least one of the containers is arranged to receive RF energy or the data RF signal from more than one container upstream of it.

* * * * *